INVENTOR
CHARLES V. STALLER
NICK W. KISH

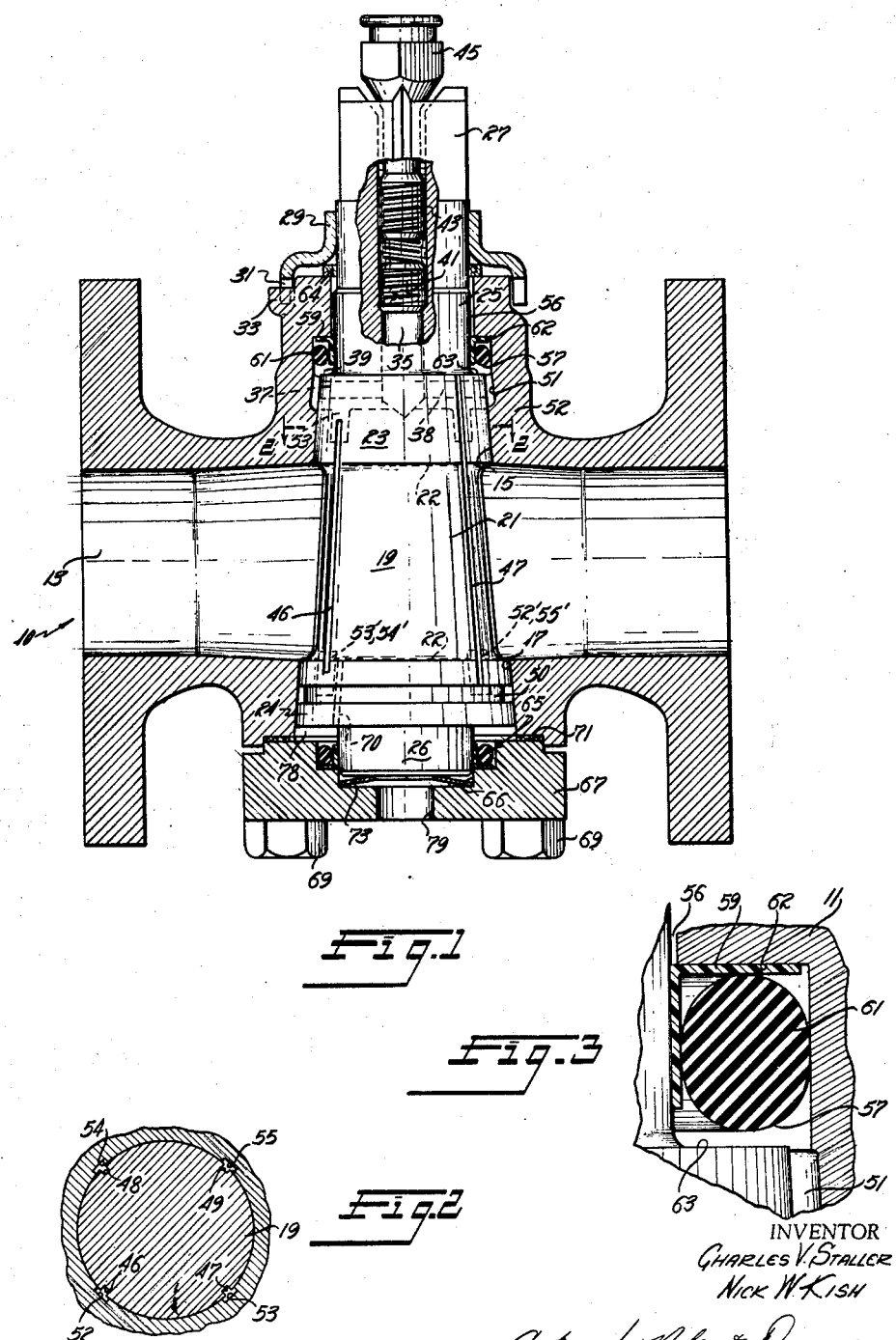

BY Strauch, Nolan & Wiggins

ATTORNEYS

United States Patent Office

2,945,668
Patented July 19, 1960

2,945,668

PLUG VALVES

Charles V. Staller and Nick W. Kish, Barberton, Ohio, assignors to Rockwell Manufacturing Company, Pittsburgh, Pa., a corporation of Pennsylvania Filed Aug. 3, 1955, Ser. No. 526,246

6 Claims. (Cl. 251—175)

This invention relates to valves for fluid pressure lines and more particularly to improvements in plug valves and in sealing, lubricating and pressure balancing structures therefor.

Plug valves are in common use in industry today and while such valves and particularly those of the tapered lubricated type provide generally satisfactory service in most applications, they have as heretofore constructed been subject to certain disadvantages which, as will be more fully explained hereinafter, tend to raise their production and service costs, shorten service life and hamper operation of the valves particularly where relatively high line pressures are involved.

It is the principal purpose and object of this invention to provide new and improved plug valve assemblies wherein the above enumerated and other disadvantages of prior valve constructions are obviated by novel structural arrangement and novel sealing, balancing and/or lubricating means as herein disclosed.

Among the weaknesses of prior plug valve constructions has been the difficulty of positively sealing the valve operating stems to prevent leakage of lubricant or line fluid about them. This difficulty is compounded by the necessity for providing a clearance fit between the valve plug stems and the bores in the valve body in which the stems rotate. The valve plugs normally are held in properly centered alignment in the valve body by mating seating surfaces, usually tapered, in the walls of the valve body and on the plug rather than by rigidly journalling the plug stems in the body, to avoid excessive machining costs. This makes it necessary in these valves to seal an annular clearance of appreciable width rather than an ordinary journal bearing. Moreover, the seal structure used must be effective against line and lubricant pressures which in many applications are quite high, and it must be capable of withstanding the corrosive effects of any line fluids with which it may come in contact.

Many different forms of rotary seals have been proposed for plug valve use, but all are subject to limitations seriously detracting from the desirability of their use. O-ring seals, as shown in U.S. Patent No. 2,651,490 to Clade, present the advantages of simplicity and low cost but have provided only imperfect sealing and relatively short service life. The necessary clearance space between the plug stem and valve body permits the O-ring to be deformed into the clearance space on application of fluid pressure as well as on jacking movement of the plug, and the deformed portion of the ring then may be worn away by the relatively rotating surfaces of the valve body and plug unless the edges of these surfaces have been very carefully rounded and smoothly finished. Moreover, the portion of the O-ring deformed into the clearance provides relatively poor sealing to the plug stem, and it may bind between the stem and valve body and thus add to the force required for rotating the plug or shifting it axially by hydraulic jacking in the manner characteristic of these valves.

We have found that these disadvantages of conventional valve stem seals may be avoided and greatly improved sealing action obtained by use of a composite ring assembly comprising a flexible, L-section ring of low friction material and an elastic O-ring disposed within the angle of the L-ring, the L-ring serving to prevent or minimize deformation of the O-ring into the clearance space between the valve body and stem and to provide a positive fluid-tight seal around the plug stem. In accordance with the invention, the two rings which together comprise the improved seal assembly are so arranged in the valve that the higher the fluid pressure against which the seal must act, the more tightly it seals to the valve body and plug stem. At the same time, however, the low friction characteristic of the L-ring facilitates rotation of the valve plug and also axial jacking movement thereof.

Accordingly, it is a further object of the invention to provide new and improved seal assemblies for plug and like valves characterized by long service life, optimum sealing action and absence of restraining effect on relative movement of elements between which it seals.

More specifically, it is an object of the invention to provide novel seal assemblies for plug valves and the like which comprise a pair of nested rings one of which is generally of L-section and fabricated of a flexible and low friction material, and the other an O-ring of elastomeric material disposed within the angle of the L-ring, the assembly being so arranged that the L-ring supports and protects the O-ring. The O-ring preferably has inside and outside diameters such that it is deformed upon insertion into the valve so as to be of generally oval section, thus pre-loading the associated L-ring into fluid tight engagement with the valve stem and the O-ring into like engagement with the surrounding valve casing.

It is also an object of the invention to provide means mounting such seal assemblies in plug and like valves and permitting ready insertion and removal of the seal assemblies for service or replacement.

Another weakness characteristic of prior tapered plug valve constructions involves the effects of high line pressures on valve operation. Depending on the direction of plug taper and the disposition and size of the plug stem or stems, increasing line pressure in prior valve constructions may act to shift the plug axially either in a direction to unseat it and permit line fluid and lubricant leakage through the thus separated seating surfaces of the valve body and plug, or in a direction to wedge the plug so tightly into its seat as to make rotation of the plug very difficult if not impossible by ordinary means. Various schemes for balancing pressures to minimize or prevent these effects have previously been proposed, but none to our knowledge offer the simplicity of structure, flexibility of application and other advantages which characterize the balanced valve constructions of the present invention.

Briefly described, balancing of tapered plug valves in accordance with the invention is effected by providing cylindrical extensions or stems on both ends of the tapered valve plug, each extension being provided with a radial seal and having its outer end exposed to atmospheric pressure and further providing for annular pressure chambers at the ends of the tapered valve plug in surrounding relationship to the valve stems and positioned inwardly of the radial seals adjacent the ends of the valve plug together with means for applying fluid pressure to the chambers. Since the stems are exposed to atmosphere so that no appreciable pressure acts on the exposed ends of the stems, it will be appreciated that variations in the cross sectional area of the stems have a direct effect on the pressure fluid forces being exerted on the ends of the tapered plug by pressure fluid in the pressure chambers at each end of the plug. Thus by making the stem at the smaller end of the tapered plug of larger cross section than that of the stem at the larger end of the plug, the fluid pressure acting on the larger end base of tapered valve plug in the chamber surrounding the stem at the larger end of the plug provides for a net upward axial force moving the valve plug toward the smaller end of its cross seating bore and into engagement with the seating surfaces formed by the valve body. Preferably, the stem at the larger end of the tapered valve plug is made slightly smaller than that at the other end thereof, in order to achieve a slight hydraulic bias to urge the tapered plug more firmly into its seat. This bias tends to increase with increasing line pressure thus providing the greater seating forces generally desired at high line pressures for preventing leakage between the valve seating surfaces.

It therefore is another object of the invention to provide new and improved tapered plug valve assemblies wherein the plug member is constructed to utilize line pressure in novel manner to provide the desired seating action.

More specifically, it is an object to provide novel tapered plug valve assemblies wherein line pressure is used to make the plug substantially freely floating or to provide a plug seating force which increases in desired ratio to increasing line pressure.

These and other objects, features and advantages of the invention will become more fully apparent by reference to the appended claims and the following detailed description when read in conjunction with the accompanying drawings, wherein:

Figure 1 is an axial section through one form of plug valve assembly embodying to the invention;

Figure 2 is a fragmentary section on line 2—2 of Figure 1 illustrating the valve lubrication grooves;

Figure 3 is a fragmentary detail view showing a portion of the seal assembly of Figure 1 greatly enlarged.

Figure 4:
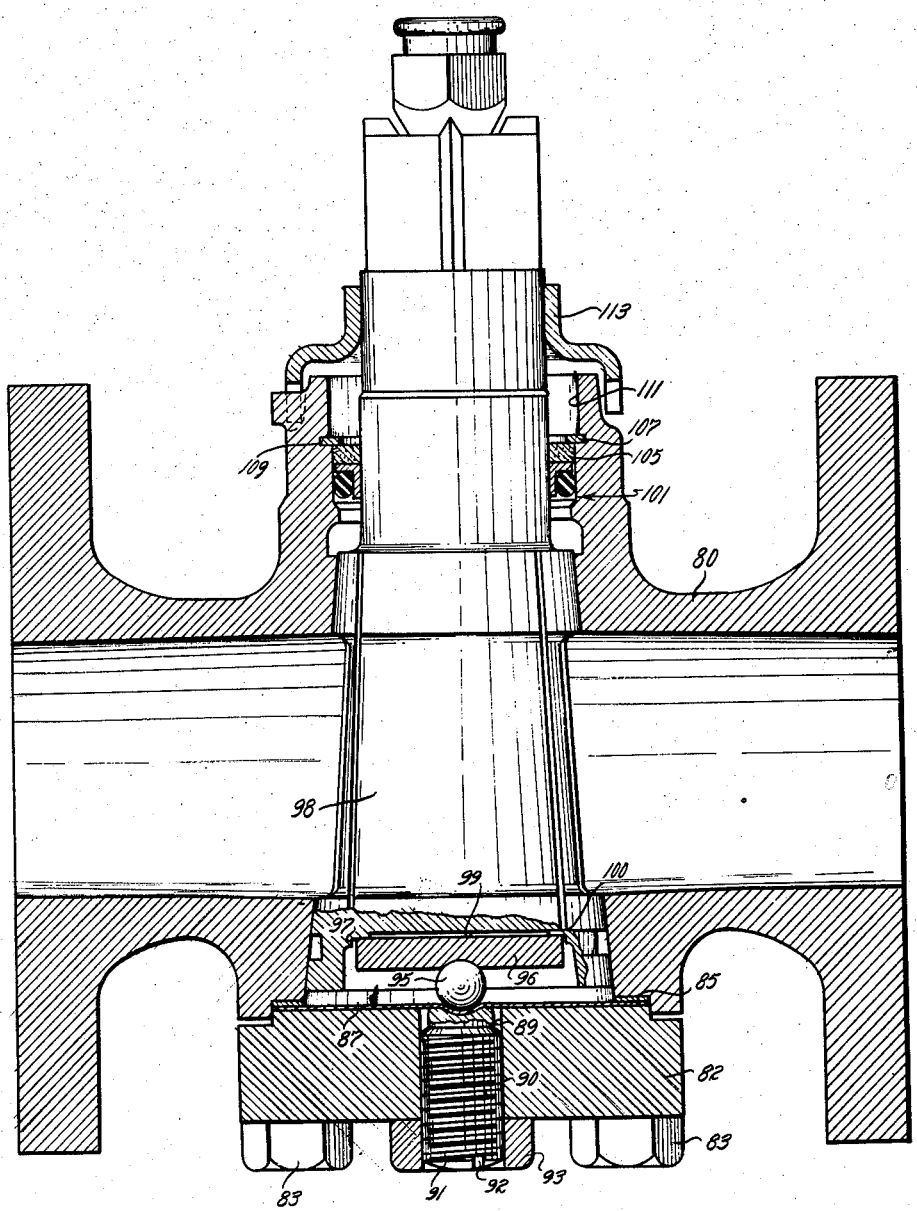
Figure 4 is an axial section through a modified plug valve assembly particularly suited to relatively lower line pressure applications.

With continued reference to the drawings, wherein like reference numerals are used throughout to designate like parts, the lubricated plug valve designated generally by reference numeral 10 in Figure 1 incorporates sealing and balancing structures in accordance with the invention.

In Figure 1, a valve body or casing 11 is provided with a through passage 13 for flow of fluid and a transverse passage having a tapered valve seat portion comprising an upper conical valve seat surface 15 and a lower conical valve seat surface 17 providing annular radial and thrust bearing surfaces for a tapered valve plug member 19 having a through port 21 as indicated by dotted lines 22 in Figure 1, the valve plug being shown in valve open position in this figure.

Valve plug 19 has upper and lower conical seating surfaces 23 and 24 cooperating respectively with the upper and lower valve seat surfaces 15 and 17 of the valve body. A cylindrical plug stem 25 is formed integrally with or otherwise secured to valve plug 19 above seating surface 23 thereof and extends upwardly out of valve body 11. A similar stem 26 may be provided on the lower end of the valve plug as shown. The upper plug stem 25 may have a head portion 27 of square section as illustrated or other suitable form whereby the head may readily be engaged and rotated as by a wrench or similar tool. When the wrench is applied to head 27 and rotated, plug 19 may be rotated between 90° apart open and closed positions, rotation being limited by a stop collar 29 suitably detachably clamped or otherwise mounted on stem 25 and having a depending stop arm or flange 31 which engages an integral projection 33 on valve body 11 at 90° extremes to limit plug movement.

Internally, stem 25 is provided with an axial threaded bore 35 which is in open communication through cross bores 37 and 38 at its lower end with a lubricant chamber 39 in the valve body, this chamber surrounding valve plug 19 adjacent the smaller upper end thereof. Bore 35 may contain in threaded assembly a ball check valve unit 41 for preventing upward flow and escape of lubricant from chamber 39 and a rotatable lubricant screw 43 having an operating head 45 extending above stem 25.

As shown in Figures 1 and 2, the surface of valve plug 19 is formed with four longitudinal surface grooves 46, 47, 48 and 49 spaced 90° apart. Grooves 47 and 48 at their lower ends communicate with an annular groove 50 which extends around the lower conical seating surface 24 of the plug as illustrated in Figure 1. At their upper ends, grooves 47 and 48 communicate with an annular groove 51 in valve body 11 forming a part of lubricant chamber 39. Grooves 46 and 49 terminate short of communication with grooves 50 and 51, but extend within the area of the upper seating surfaces 15 and 23 and lower seating surfaces 17 and 24 of the valve body and plug, respectively, as shown.

Seating surface 15 of valve body 11 is formed with four equally spaced short longitudinal grooves 52, 53, 54 and 55 that extend down from groove 51. Seating surface 17 is formed with four equally spaced short longitudinal grooves 52', 53', 54', and 55'. Grooves 52—55 thus open at their upper ends into annular groove 51 in the valve body and extend along seating surface 15 in 90° spaced relation to overlap with the upper ends of plug grooves 46 and 49 when the plug is at either extreme of its 90° movement, whereby when the plug is in the valve open position of Figure 1 and when it is in the 90° rotated valve closed position wherein the plug port 21 is normal to passage 13, plug grooves 46 and 49 are in communication both with the annular groove arrangement at seating surface 15 and with the annular groove 50 through the short body grooves.

Upon removal of lubricant screw 43 from bore 35 in plug stem 25, lubricant in stick or other form may be dropped into the top of bore 35. Then the lubricant screw is inserted and rotated within bore 35 to place the lubricant therein under pressure so as to displace lubricant downwardly through check valve assembly 41, through cross bores 37 and 38 and into reservoir 39. Lubricant thus pressurized in reservoir 39 fills the annular groove 51 in the valve body and also fills the short longitudinal grooves 52—55 connecting therewith. If the valve plug is in full open position as shown in Figures 1 and 2, these valve body grooves 52—55 are each in register with one of the grooves 46—49 in the valve plug, thus supplying lubricant under pressure to the plug valve grooves and to the seating surfaces into which they extend. Lubricant under pressure also flows through the plug valve grooves 46—49 to annular groove 50 in the lower conical seating surface 24 of the valve plug 19.

When the plug is turned 90° from the position of Figure 1, i.e., to full closed position, the above described lubricant distribution circuit will be substantially the same except that the longitudinal plug grooves 46—49 will be displaced 90° so that groove 46 will now be in register at its opposite ends with short grooves 53 and 53' and the other plug grooves 47—49 correspondingly connected. Thus, in either of the 90° operative positions of the valve plug, the lubricant reservoir comprising the space within bore 35 and chamber 39 is connected through the above described groove systems with the seating surfaces 15, 17, 23 and 24 of the valve body and plug, the lubricant being displaced through the system until the reservoir spaced and the grooves are entirely filled with lubricant. When the plug is rotated to open or close the valve this lubricant in the grooves is smeared over the seating surfaces to lubricate them and provide a plastic seal against escape of line fluid.

Further rotation of lubricant screw 43 will place the lubricant in the reservoir space above the small end of the plug under increased pressure. This build-up of pressure against the one end of the plug exerts a hydraulic jacking action on the plug to axially displace the plug and separate the valve body and plug upper seating surfaces 15 and 23 and lower seating surfaces 17 and 24, for freeing the plug should it be frozen or difficult to rotate.

Pressurized lubricant in the annular groove 50 in the plug seating surface 24 also will contribute to the jacking action if the plug is in either of its 90° extreme positions, at which positions lubricant under pressure is supplied to this groove. However, the jacking action at the upper end of the valve is, by reason of the relative effective areas against which the lubricant pressure acts, much greater than any such action at groove 50 and is more than adequate alone to free the plug for rotation. It is to be noted that this jacking action at the plug upper end permits lifting and freeing the plug at mid positions as well as at full open and full closed positions, and also permits freeing the plug even when its lubricant grooves are clogged. Furthermore, the plug when frozen can if necessary be loosened from its seat by rapping on the outer end of the plug stem.

As noted above, plug stem 25 and the bore in valve body 11 through which the stem extends are of relative diameters such as to provide an annular clearance 56 providing a loose fit between the stem and bore, the plug being held properly axially aligned within body 11 by the plug and body seating surfaces 15, 17, 23 and 24 rather than by rigidly journalling the plug stems in the valve body. Escape of lubricant from lubricant chamber 39 upwardly through this annular clearance 56 is positively prevented by use of the novel radial seal 57.

In accordance with the invention, this seal 57 comprises a flanged sleeve or L-section ring 59 and an O-ring 61 disposed in the angle of the ring 59 as shown. The axially extending annulus or cylindrical sleeve portion of L-ring 49 slidingly and rotatably seals against the cylindrical periphery of plug stem 25, and the radially extending annulus or flat flange of the L-ring seals against a flat shoulder 62 formed in valve body 11. O-ring 61 then seals between the L-ring 59 and the bore in valve body 11 where enlarged to form lubricant chamber 39 therein. Axial movement of the seal assembly responsive to lubricant pressure or due to other cause is limited on the one hand by shoulder 62 in valve body 11 and on the other by a shoulder 63 formed on plug 19 at its connection to stem 25.

The L-section ring 59 preferably is fabricated of a fairly stiff but flexible material of limited elasticity having a low coefficient of friction with respect to the metal of plug stem 25. The plastic composition widely sold under the trade name "Teflon," which applicants may be produced by polymerizing tetrafluoroethylene in accordance with the method of Patent No. 2,393,967 to Brubaker, has been found very satisfactory particularly because of its good friction characteristics, though other materials such, for example, as leather, neoprene and the like may instead be used. Ring 59 is light, non-metallic, resistant to chemical attack by most lubricants and line fluid and shows great dimensional stability when heated. The O-ring 61 is itself of conventional type and may be fabricated of rubber, natural or synthetic, or of other suitable elastomeric material, and it preferably has inside and outside diameters such that on insertion into place in the valve it is deformed to be of generally oval section as shown, to thus ensure that L-ring 59 is pre-loaded firmly into engagement with stem 25 and that the O-ring at its outside diameter sealingly engages the surrounding wall of the valve body even in the absence of fluid pressure in lubricant chamber 39.

In operation, lubricant under pressure in the lubricant chamber 39 acts directly on the seal assembly 57 to urge it upwardly against the shoulder 62 in valve body 11. The low friction plastic L-ring 59 seals tightly about the plug stem 25, which however rotates within it, and the elastomeric O-ring 61 functions as a static seal to valve body 11 and, as noted, also acts as a pre-loading member for the L-ring, urging it firmly into engagement with plug stem 25 about its entire circumference. Because it has little or no elasticity, L-ring 59 does not deform into the annular clearance 56 between the plug stem and valve body even at relatively high line pressures, and even at such pressures the valve plug is both freely rotatable and freely axially movable within the seal assembly because of the low friction characteristics of its L-ring 59, thus greatly facilitating jacking of the valve plug in the manner described above.

If desired, a dust seal comprising a ring 64 of felt, leather or other suitable material may be provided between the stop collar 29, plug stem 25 and valve body 11 for preventing entrance of dirt and other foreign matter into the annular clearance space 56 between the valve body and plug stem.

The stem 26 projecting downwardly from the lower end of plug 19 is as shown provided with a radial seal 65 which preferably is similar in structure to seal 57 described above. The lower stem and seal are received within a stepped bore 66 in the inner face of a closure plate 67 detachably secured as by bolts 69 to valve body 11 and closing the lower end of the plug bore through the valve body. A gasket or shim 71 in the joint between the valve body and closure plate seals against leakage through this joint, the thickness of the gasket used being selected so as to provide the proper degree of compression of a spring washer 73 interposed between the lower end of plug stem 26 and the floor of the stepped bore 65 in which the stem is received.

This spring washer 73 preferably is arranged to coact with the valve body in a manner to provide a positive stop for readily permitting but positively limiting axial movement of the plug. The plug loading spring 73 may have approximately constant load-deflection characteristics at least through a substantial part of the permissible range of movement of the valve plug, to thus make the plug seating force substantially independent of the vertical position of the plug and uninfluenced by production tolerances.

Moreover, engagement of the spring washer 73 with the bottom of bore 65 in valve body closure plate 67 provides a positive stop limiting downward movement of the valve plug and, accordingly, also limiting the maximum thickness of the lubricant film between the tapered seating surfaces of the valve. This prevents excessive separation of the valve seating surfaces with consequent waste of lubricant and imperfect sealing, and also ensures that the film thickness originally established on lubrication of the valve will be the optimum for best sealing and lubricating effect.

The positive stop construction is of particular advantage in valves having valve stem sealing and plug balancing structure in accordance with the present invention, for the reason that provision of positive stop means enables use of substantially lower plug loading spring pressures than heretofore have been considered feasible. Accordingly, plug loading under any given set of flow conditions becomes less dependent on the loading spring used and more dependent on fluid pressure balancing of the plug, and since in the preferred embodiment of the invention the loading applied by line pressure is negligible at low line pressures and increases in desired predetermined ratio to increasing line pressure, it becomes possible to construct plug valves so as to have only the minimum plug loading required to prevent leakage at existing line pressure and at relatively low line pressures to have substantially reduced loading and resultant easier operation. At the same time, the novel plug stem seal construction of the invention coacts with the lighter plug loading spring to permit jacking and freeing stuck valves with substantially reduced lubricant jacking pressures.

As noted above, the larger end of valve plug 19 is provided with a bore 70 therethrough connecting line passages 13 and 21 and the chamber 78 below the plug and a bore 79 or other opening also is provided through the valve body closure plate 67 to place the area below stem 26 of valve plug 19 at atmospheric pressure. It will be appreciated that by the above tapered plug valve construction, a net axial fluid line pressure force is established to move plug 19 toward the smaller end of the valve seating bore and into engagement with plug seating surfaces 15 and 17. This is accomplished in accordance with the present invention by exposing stems 25 and 26 to atmospheric pressure, and providing for the annular pressure chambers 78 and 39 at the ends of the plug. Both pressure chambers 39 and 78 positioned inwardly of O ring seals 57 and 65 respectively to prevent outward flow of fluid between the stems and the valve body, surround stems 25 and 26 so as to be open and adjacent to the respective end of plug 19. By this structure, the fluid pressure acting through bore 70 on the larger end base of plug 19 in chamber 78 provides for an upward axial force moving plug 19 toward the smaller end of its seating bore and into engagement with seating surfaces 15 and 17 and pressure in chamber 39 acting on the smaller end of plug 19 provides for a downward force. Since stems 25 and 26 are exposed to atmosphere, it will be appreciated that variation in cross sectional areas of the stems has a direct effect on the pressure fluid forces being exerted on the ends of tapered plug by pressure fluid in pressure chambers 39 and 78 at each end of plug 19. Thus by this structure, the area of the end faces of plug 19 over which pressure fluid acts is varied so as to obtain a net axial pressure fluid force that varies directly with the line fluid pressure and acts to move tapered plug 19 into seating engagement on seating surfaces 15 and 17 in the valve seating cross bore. Consequently, at the upper end of the plug fluid pressure will act upwardly in the valve port on a net area equal to the sectional area of the stem 25 at the seal 57. At the lower end of the plug the fluid pressure will act downwardly in the valve port on a net area equal to the sectional area of stem 26 at its seal 65. These ends of both stems are exposed to atmospheric pressure. If the two plug stems 25 and 26 are made of equal cross sectional areas at the points at which they pass through their respective seals, line pressure then will act on the plug equally in both directions so as to make plug seating force completely independent of line pressure, to thus obtain the advantages characteristic of conventional floating plug type valves without the mechanical complexity and attendant higher cost thereof.

The ideal condition for most applications, however, requires that the plug seating force increase slightly with increasing line pressure. This is readily accomplished in the plug valves of the invention by making the upper stem 25 of the valve plug of slightly greater cross-sectional area than the lower stem 26. When this is done line pressure acts upwardly on the valve plug over a correspondingly greater effective area than that over which it acts downwardly on the plug, which results in a slight hydraulic bias urging the plug upwardly and more firmly into its seat. As will be apparent the net upward force on the plug will increase with increasing line pressure, in any desired ratio dependent on the ratio of the stem cross-sectional areas selected.

If desired, means may be provided for plugging the bore 79 in valve body closure plate 67 to prevent entrance of foreign matter into the valve or leakage therefrom, such plug means if used being opened or removed prior to operating the valve in order to obtain hydraulic balancing as just described and the easier valve operation attributable thereto.

With reference now to Figure 4, a modified form of plug valve is illustrated which omits the hydraulic balancing feature of Figure 1 and thus is particularly adapted to low pressure applications wherein a wedged plug action with increasing line pressure is not objectionable. As shown, the valve body 80 is closed at its lower end by a closure plate 82 preferably of heavy steel secured as by bolts 83 to the body 11. An annular gasket 85 may be provided to seal between body 11 and a diaphragm 87 which preferably is of thin, easily flexed metal and covers the upper surface of closure plate 80. A threaded bore 89 in the center of closure plate 80 receives a stud 90 having an externally disposed head portion 91 provided with a kerf 92, adapted to be engaged by a screwdriver or similar tool for rotating the stud for axial adjustment thereof. A lock nut 93 may be provided for locking the stud in adjusted position.

The upper end of stud 90 has as shown a part spherical depression therein in which is received a part spherically deformed portion of diaphragm 87. Directly opposite stud 90, a steel thrust ball 95 rests in the spherical deformation in diaphragm 87 and is pressed downwardly against the diaphragm and stud by a heavy disc spring 96 mounted in a recess 97 in the lower end of valve plug 98 and supported clear of the floor 99 of the recess at its periphery as by an annular shoulder 100 formed in the wall of the recess.

The modification of Figure 4 also differs from that of Figure 1 in that the radial seal 101 for the upper plug stem 103 in Figure 4 which is the same as seal 57 is held in position by a removable assembly comprising a packing washer 105 and a split ring 107 engaging in an annular groove 109 formed in the wall of the valve body bore 111 through which extends the plug stem. This arrangement is of advantage particularly in that it permits removal and replacement of the seal 101 without removal of the plug from the valve body, the seal being lifted upwardly out of the valve body by application of lubricant pressure or in other suitable manner after first removing the detachable stop collar 113, split ring 107 and packing washer 105.

As is apparent from the foregoing, the plug valves and valve lubrication sealing and balancing features of the present invention offer many important advantages over prior plug valve constructions, principally in easier and lower cost manufacture, better sealing against escape of lubricant and line fluid, and improved operation particularly as regards lubricant jacking of the valve plug and its balancing against effects of line pressures. While the invention has been specifically described in reference to valves of lubricated plug type, it will be understood that in certain of its aspects it is applicable to plug and other valves and related mechanisms generally.

The invention may be embodied in other specific forms without departing from the spirit or essential characteristics thereof. The present embodiments are therefore to be considered in all respects as illustrative and not restrictive, the scope of the invention being indicated by the appended claims rather by the foregoing description, and all changes which come within the meaning and range of equivalency of the claims are therefore intended to be embraced therein.

What is claimed and desired to be secured by United States Letters Patent is:

1. In a balanced plug valve, a casing having a passage therethrough for flow of line fluid and a tapered plug seat formed transversely of said passage; a correspondingly tapered valve plug rotatably received in said plug seat free for limited axial movement in said casing toward and from engagement with said plug seat; means resiliently biasing said plug axially toward engagement with said plug seat; means defining a lubricant chamber in said casing adjacent and open to the smaller end of said tapered plug seat and a balancing chamber adjacent and open to the larger end of said tapered plug seat; a first valve stem operatively connected with said tapered plug at the smaller end thereof and extending through said lubricant chamber and at least partially through an outwardly open bore in said casing means defining said lubricant chamber; a second valve stem operatively connected to the larger end of said plug and extending outwardly through said balancing chamber and at least partially through an outwardly open bore in said casing means defining said balancing chamber; means applying line fluid pressure in said flow passage to said balancing chamber; means in said casing forming inwardly facing annular abutment means surrounding each of said valve stems; and means sealing against leakage outwardly between each of said stems and its respective casing bore including a non-metallic non-elastic L-section ring having an axially extending annulus in surrounding smooth surface engagement with the valve stem inwardly of its associated abutment means and a radially extending annulus disposed adjacent said abutment means, and an O-ring of resilient material compressed between the axially extending annulus of the L-ring and the casing wall bore in sealing relation with the latter.

2. In a balanced plug valve assembly, a body having a fluid flow passage therethrough, a tapered bore in said body intersecting said passage, a tapered ported plug rotatably mounted in said bore for movement between positions where it closes or aligns its port with said passage, said plug being mounted for limited axial displacement in said bore, a first axially extending valve stem at the smaller end of the plug, a second axially projecting valve stem at the larger end of the plug, both of said valve stems having horizontal cross sectional end areas exposed to ambient atmospheric pressure, means surrounding both of said stems and sealing against the outward escape of line fluid pressure, and means for applying line fluid pressure to the upper and lower ends of the plug within the body and inwardly of said sealing means over such relative areas as to exert a net hydraulic force on said plug toward the smaller end of the plug that increases with increases in said line pressure.

3. In the balanced plug valve assembly defined in claim 2, said means for applying line fluid pressure to the plug ends comprising annular pressure chambers at the plug ends surrounding said valve stems and a direct passage through said plug connecting the port thereof with the chamber surrounding the larger end of the plug.

4. In the balanced plug valve assembly defined in claim 2 wherein the cross-sectional area of the stem at the smaller end of the plug is greater than the cross-sectional area at the larger end of the plug.

5. In a high pressure lubricated balanced plug valve, a body having a flow passage therethrough and a tapered plug bore formed transversely of said passage and forming conical plug seating surfaces on opposed sides of said passage; a correspondingly tapered ported valve plug rotatably received in said plug bore and free for limited axial movement in said body; and means for hydraulically urging said tapered plug toward the smaller end of said bore and into engagement with said seating surfaces with an axial force varying with the pressure of fluid passing through said passage comprising: a first valve stem joined to said tapered plug at the smaller end thereof, first sealing means surrounding said first valve stem for sealing against leakage outwardly between said first stem and said body, said first stem extending beyond said first sealing means and having an effective area exposed to atmospheric pressure extending outwardly of said first sealing means and transversely to the axis of plug rotation, a second stem joined to the larger end of said tapered plug, second sealing means surrounding said second stem for sealing against leakage outwardly between said body and said second stem, said second stem extending beyond said second sealing means and having an effective area exposed to atmospheric pressure extending outwardly of said second sealing means and transversely to the axis of plug rotation, said effective area exposed to atmospheric pressure of said second stem being less than the effective area exposed to atmospheric pressure of said first stem, means defining a lubricant chamber inwardly of said first sealing means in surrounding relationship to said first stem, said lubricant chamber being adjacent and open to the smaller end of said tapered plug around said first stem for communication with said sealing surfaces and adapted to contain lubricant under pressure for jacking said tapered plug toward the larger end of said bore, means defining a fluid pressure chamber inwardly of said second sealing means in surrounding relationship to said second stem, said fluid pressure chamber being adjacent and open to the larger end of said tapered plug around said second stem and in communication with said seating surfaces adjacent the larger end of said plug, and means defining a fluid passage in said tapered plug independent of said seating surfaces and continuously interconnecting said fluid pressure chamber with the port of said tapered plug for introducing line pressure fluid from said flow passage into said pressure chamber to provide a net axial pressure fluid force urging said plug toward the smaller end of said bore.

6. In a lubricated plug valve, a body having a flow passage therethrough and a tapered plug bore formed transversely of said passage and forming conical plug seating surfaces on opposed sides of said passage; a correspondingly tapered valve plug rotatably mounted in said bore and free for limited axial movement in said body; first and second valve stems joined to said tapered plug at opposed ends thereof; first and second resilient sealing means respectively surrounding said first and second valve stems for sealing against leakage outwardly between said stems and said body; means providing grooves in the plug and bore seating surfaces for distributing pressure lubricant to said seating surfaces for lubricating and axially jacking said tapered plug toward the larger end of said bore; and fluid sealing means disposed inwardly of said resilient sealing means for sealing the ends of said plug with said body to retain lubricant between said seating surfaces comprising means within said body defining a lubricant chamber inwardly of said first resilient sealing means in surrounding relationship to said first stem, said lubricant chamber being open and adjacent to the smaller end face of said plug around said first stem in communication with said grooves and adapted to contain fluid under pressure for opposing the pressure exerted by lubricant on said seating surfaces from the smaller end of said plug with said body, means within said body defining a fluid pressure chamber inwardly of said second resilient sealing means in surrounding relationship to said second stem, said chamber being adjacent and open to the larger end of said tapered plug, and fluid passage means in said tapered plug formed independent of said seating surfaces and continuously interconnecting said chamber with the port of said tapered plug for introducing line pressure fluid from said flow passage into said chamber to oppose the pressure of the lubricant between said sealing surfaces at the larger end of plug.

References Cited in the file of this patent

UNITED STATES PATENTS

| Number | Name | Date |
|---|---|---|
| 1,469,762 | Nordstrom | Oct. 2, 1923 |
| 1,507,828 | Harper | Sept. 9, 1924 |
| 1,574,925 | Nordstrom | Mar. 2, 1926 |
| 2,048,884 | Nordstrom | July 28, 1936 |
| 2,349,170 | Jackman | May 16, 1944 |
| 2,427,789 | Kehle | Sept. 23, 1947 |
| 2,573,238 | Wunn | Oct. 30, 1951 |
| 2,630,294 | Ericson | Mar. 3, 1953 |
| 2,651,490 | Clade | Sept. 8, 1953 |
| 2,707,613 | Wheatley | May 3, 1955 |
| 2,767,729 | Mueller | Oct. 23, 1956 |